(12) United States Patent
Ghosh et al.

(10) Patent No.: US 12,314,787 B2
(45) Date of Patent: May 27, 2025

(54) SERVING APPLICATION PROGRAMMING INTERFACE CALLS DIRECTED TO HIERARCHICAL DATA FORMAT FILES STORED IN FABRIC-ATTACHED MEMORIES

(71) Applicant: HEWLETT PACKARD ENTERPRISE DEVELOPMENT LP, Spring, TX (US)

(72) Inventors: Chinmay Ghosh, Karnataka (IN); Sharad Singhal, Milpitas, CA (US); Porno Shome, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 224 days.

(21) Appl. No.: 18/308,019

(22) Filed: Apr. 27, 2023

(65) Prior Publication Data

US 2024/0362094 A1    Oct. 31, 2024

(51) Int. Cl.
*G06F 3/00*    (2006.01)
*G06F 3/06*    (2006.01)
*G06F 9/54*    (2006.01)

(52) U.S. Cl.
CPC ............ *G06F 9/547* (2013.01); *G06F 3/0604* (2013.01); *G06F 3/0635* (2013.01); *G06F 3/067* (2013.01)

(58) Field of Classification Search
None
See application file for complete search history.

(56) References Cited

U.S. PATENT DOCUMENTS

| 2018/0018590 | A1  | 1/2018 | Szeto |
| 2018/0232404 | A1* | 8/2018 | Bhatti ............... G06F 16/9024 |
| 2021/0133123 | A1  | 5/2021 | Feehrer et al. |
| 2022/0257599 | A1  | 8/2022 | Heller et al. |

FOREIGN PATENT DOCUMENTS

CN    108762763    11/2018

OTHER PUBLICATIONS

Ceph authors and contributor, "Ceph Storage Cluster", available onlline at <https://docs.ceph.com/en/quincy/rados/index.html>, 2016, 2 pages.

(Continued)

*Primary Examiner* — Midys Rojas
(74) *Attorney, Agent, or Firm* — Trop, Pruner & Hu, P.C.

(57) ABSTRACT

In accordance with example implementations, a process includes receiving, by a connector that is associated with a compute node and is associated with a fabric-attached memory (FAM), an application programming interface (API) called to perform an operation that is associated with a hierarchical data format (HDF) object of an HDF file. The API call includes a HDF object identifier, which corresponds to the HDF object. The process includes, responsive to the request, based on the HDF object identifier, accessing, by the connector, mapping information that is stored in the FAM; and using, by the connector, the mapping information to identify a FAM descriptor corresponding to a first data item that is stored in the FAM and corresponds to the HDF object. The process includes, responsive to the request, serving, by the connector, the API call responsive to the identification of the FAM descriptor.

20 Claims, 7 Drawing Sheets

(56) References Cited

OTHER PUBLICATIONS

Intel, "Daos: Revolutionizing High-Performance Storage", available online at <https://www.intel.in/content/www/in/en/high-performance-computing/daos-high-performance-storage-brief.html>, 2021, 5 pages.

OpenFAM, accepted for publication in CCPE journal.

Singhal et al., "OpenFAM: A Library for Programming Disaggregated Memory", OpenSHMEM, 2021.

Hewlett Packard Enterprise Development Co. LLP; "OpenFAN Reference Implementation"; OpenFAM: A library for programming Fabric-Attached Memory; https//openfam.github.io; Copywrite 2021; downloaded on Jan. 1, 2023; 4 pp.

The HDF Group; "Introduction to HDF5"; http://web.mit.edu/fwtools_v3.1.0/www/H5.intro.html; downloaded on Apr. 27, 2023; 34 pp.

Intel; DAOS Storage and High Performance Computing (HPC) Solutions; https://www.intel.com/content/www/us/en/high-performance-computing/daos.html; downloaded on Apr. 27, 2023; 7 pp.

"Intro To Ceph"; Licensed under Creative Commons Attribution Share Alike 3.0 (CC-BY-SA-3.0). Revision 6de55cb7.; https://docs.ceph.com/en/quincy/rados/index.html; 2016; downloaded on Apr. 27, 2023; 2 pp.

\* cited by examiner

SERVING APPLICATION PROGRAMMING INTERFACE CALLS DIRECTED TO HIERARCHICAL DATA FORMAT FILES STORED IN FABRIC-ATTACHED MEMORIES

GOVERNMENT LICENSE RIGHTS

This invention was made with Government support under Agreement No. H98230-15-D-0022 awarded by the Maryland Procurement Office. The Government has certain rights in this invention.

BACKGROUND

A distributed system includes networked compute nodes that coordinate their processing activities to achieve a common goal. As an example, a high performance computer (HPC) cluster is a distributed system that performs parallel processing to solve computationally-complex problems. Other examples of distributed systems include database management systems, file storage systems, content delivery systems, software defined servers (SDSs) and cloud computing systems.

DETAILED DESCRIPTION

Figure 1:
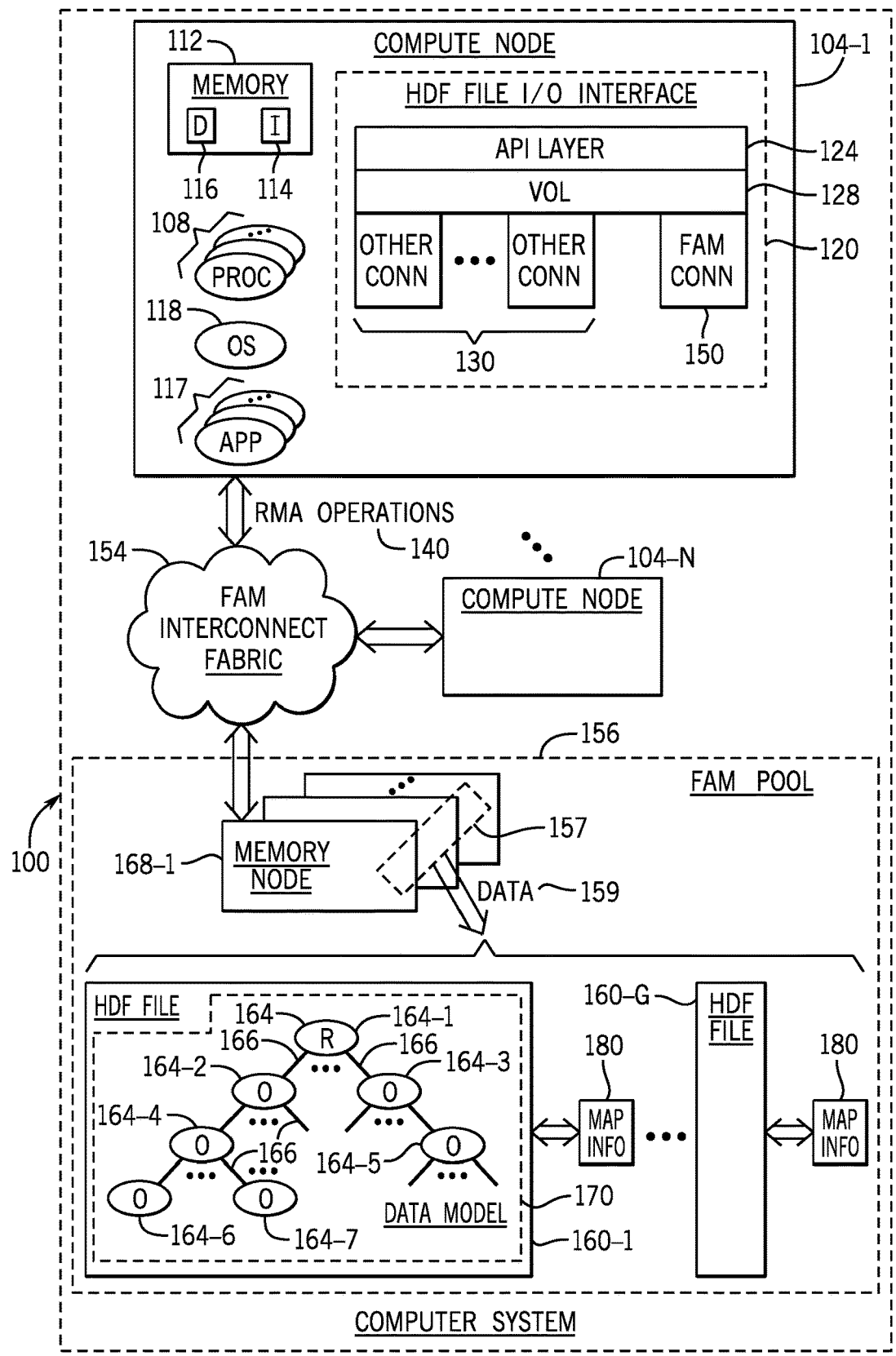
FIG. 1 is a block diagram of a distributed system having a hierarchical data format (HDF) file input/output (I/O) interface that serves application programming interface (API) calls directed to HDF files that are stored in a fabric-attached memory (FAM) pool according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology that is used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

The compute nodes of a distributed system may produce and operate on voluminous and complex heterogenous data. For example, a distributed system that performs parallel processing may operate on and produce data representing numeric arrays, which may have a wide variety of data types and formats. A distributed system may store its data as files in persistent storage. A hierarchical data format (HDF) file, such as an HDF version 4 (HDF4) file or an HDF version 5 (HDF5) file, supports large, complex, portable and heterogenous data. The HDF5 file format specification is available from the HDF Group and is described in the HDF5 File Format Specification Version 3.0, which may be found at https://docs.hdfgroup.org/hdf5/develop/_f_m_t3.html.

An HDF file may be viewed as a file system that is contained and described within a single file. More specifically, the HDF file contains a hierarchy of objects (referred to as the "HDF hierarchy" herein), which contains two primary object types: group objects and dataset objects. A group object may be viewed as being analogous to a directory (e.g., a UNIX directory), which can host one or multiple HDF objects (e.g., other group objects, dataset objects and other objects) that are descendants of the group object. The beginning, or root, of the HDF hierarchy is a group object, which represents the file. A dataset object stores data elements.

An HDF file may contain objects other than group objects and dataset objects, such as a datatype object that describes a data element type of a dataset object, and a dataspace object defines a logical layout, or organization, of the data elements of a dataset object. An attribute object contains metadata that describes properties of a group object, dataset object or datatype object. For example, an attribute object may contain metadata describing a particular group object being associated with a particular project or metadata describing a particular dataset being sensor data collected at a particular time at specific location.

In one approach, a distributed system may store an HDF file in hard disk drives (HDDs)-based storage, such as a storage that include HDDs attached to the compute nodes or HDDs of a distributed file storage system (e.g., a storage area network (SAN)). In another approach, a distributed system may store an HDF file in a shared memory pool (e.g., a pool of persistent memory) of a compute node-centric architecture. More specifically, pursuant to the compute node-centric architecture, the compute nodes own respective local memories, and the compute nodes rely on the copying of data and message passing among the compute nodes to enable the shared memory pool. The relatively slow access times and small bandwidths of the foregoing approaches for storing HDF files may limit the performance of HDF file input/output (I/O) operations.

In accordance with example implementations that are described herein, HDF files for a distributed system may be stored in a fabric-attached memory (FAM) pool (e.g., a FAM pool providing persistent storage). The FAM pool corresponds to a memory-centric architecture in which the shared memory is separated, or disaggregated, from the compute nodes, which allows the shared memory to be scaled independently from the compute nodes. The compute nodes share a common view of the FAM pool, and the memory-centric architecture avoids message-based coordination of memory accesses and other performance-limiting aspects that are part of the compute node-centric architecture. The FAM pool may include memory servers, or nodes, which contain memory devices (e.g., non-volatile, or persistent, memory devices).

A FAM pool may be organized into memory regions (called "FAM regions" herein), which are blocks of memory. A given FAM region has the same properties (e.g., resilience properties, security properties or other memory-related properties) throughout. Data for a FAM region is allocated into units called "data items" (also referred to as "FAM data items" herein). A FAM data item inherits the properties of the FAM memory region in which the FAM data item is located. For access purposes, FAM memory regions and FAM data items are identified by corresponding FAM descriptors. For example, a FAM descriptor for a region may specify a region identification (ID), and a FAM descriptor for a particular data item may specify a region ID (for the region containing the data item) and an offset within the region corresponding to intra-region location of the data item. In accordance with some implementations, the FAM pool may be accessed by application programming interface (API) calls, such as the set of API calls that are defined by the OpenFAM library that is described in "OpenFAM: A library for programming Fabric-Attached Memory," https://openfam.github.io/index.html" and available from https://github.com/OpenFAM/API.

In accordance with example implementations, the data representing an HDF file may be stored in a single FAM region, which serves as a container for the HDF file. The HDF objects of the HDF file may be stored as respective FAM data items in the FAM memory region. In accordance with example implementations, a given compute node of a distributed system may include an HDF file I/O interface that serves HDF API calls that are generated by executing applications on the compute node and target HDF files that are stored in the FAM pool. For this purpose, the HDF file I/O interface includes an HDF file FAM connector (called a "FAM connector" herein).

In accordance with example implementations, the FAM connector is a terminal, pluggable connector that operably connects to a virtual object layer (VOL) of the HDF file I/O interface. The FAM connector handles operations specific to the FAM pool for purposes of creating, accessing, modifying and deleting HDF files, which are stored in the FAM pool. In accordance with example implementations, the VOL is hierarchically one layer below an API layer of the HDF I/O interface. The API layer, the VOL and one or multiple connectors other than the FAM connector may be affiliated with an HDF library (e.g., an HDF5 library such as the library available at https://github.com/HDFGroup/hdf5).

Responsive to an HDF API call, the API layer checks the integrity (e.g., checks semantics) of the API call, and then (assuming the integrity check passes) the API layer forwards the HDF API call to the VOL, which effectively intercepts all HDF API calls. An HDF API call that opens an HDF file stored in the FAM pool or creates an HDF file in the FAM pool selects an HDF file connector to handle the I/O operations that serve the API call. The VOL may identify the appropriate HDF file connector for a given HDF API call based on the HDF file connector that was elected when the particular HDF file referenced by the HDF API call was opened or created. In accordance with example implementations, for HDF API calls that target HDF files associated with the FAM pool, the VOL invokes a VOL callback that resolves to the FAM connector.

In accordance with example implementations, responsive to a VOL callback, the FAM connector performs one or multiple remote memory access (RMA) operations to serve the HDF API call. An RMA operation is an example of a one-sided operation in which an origin process (e.g., the process entity corresponding to the FAM connector) controls specifies all aspects of the data transfer to a target process (a process entity corresponding to the FAM memory node). In this context used herein, the FAM connector "serving" the HDF API call refers to the FAM connector performing one or multiple operations that are responsive to one or multiple functions that are requested by the HDF API call. As an example, to serve an HDF API call to create a dataset object in a particular HDF file, the FAM connector may generate one or multiple RMA operations (e.g., one or multiple Put operations, one or multiple Get operations, and/or one or multiple Allocate operations) before returning control back to the VOL.

In general, an HDF API call may specify, or reference, an identifier (called an "HDF object identifier" herein) for a particular HDF object (e.g., an HDF object that is to be created, read, modified or deleted). As described further herein, the HDF object identifier may set forth a particular hierarchical path for the HDF object (according to the HDF hierarchy of the HDF file). In accordance with example implementations, the data and metadata for objects of an HDF file are contained in respective data items of a FAM region (e.g., one data item for a corresponding HDF object), and the FAM region serves as a container for the HDF file. In accordance with example implementations, the FAM data items also store data representing distributed mapping information, which allows the FAM connector to map an HDF object identifier to a corresponding FAM descriptor for the FAM data item that contains the metadata and data for the HDF object. More specifically, in accordance with some implementations, the distributed mapping information is arranged in a distributed trie structure that includes trie nodes that are stored in respective data items of the FAM region.

In accordance with some implementations, each trie node corresponds to a key value store (KVS). The KVS store is associated with a particular HDF object (called a "parent HDF object" for the following discussion) and contains one or multiple key-value pairs. Each key-value pair, in turn, is associated with an HDF object that is a child of the parent HDF object. In this manner, the key-value pair stores an identifier (the key) for the child HDF object and a descriptor (the value) for the FAM data item that stores the data and metadata (and possibly another KVS) for the child HDF object. A given KVS may contain multiple key-value pairs for the case in which the parent HDF object had multiple children. The FAM connector may traverse the trie structure, which involves accessing multiple data items (and multiple KVSs) for purposes of ultimately determining the descriptor of the data item that corresponds to an HDF object referenced in an HDF API call.

Referring to FIG. 1, as a more specific example, in accordance with some implementations, a distributed system 100 may include one or multiple compute nodes 104. For the specific implementation that is depicted in FIG. 1, the distributed system 100 includes N compute nodes 104 (N compute nodes 104-1 and 104-N being depicted in FIG. 1). As an example, the distributed system 100 may be a distributed system in which the compute nodes 104 coordinate processing activities to achieve a common goal. As examples, the distributed system 100 may be a high performance computing (HPC) cluster, a parallel processing system, a database management system, a file storage system, a content delivery system, a software defined server (SDSs), a cloud-based computing system, or other system. In the context used herein, a "compute node" may be a logical or physical entity that is associated with a single instance of an operating system.

As an example, a compute node 104 may be an entire computer platform or a subpart thereof. In this context, a "computer platform" refers to an electronic device that has a processing resource, which is capable of executing machine-readable instructions (or "software"). As examples, a computer platform may be a server computer (e.g., a blade server, a rack server or a standalone server), a desktop computer, a notebook computer, a tablet computer, a smartphone, a storage array, a network switch, a wearable computer, a network gateway, or another electronic device that has a processing resource. As an example, the compute node 104 may be correspond to one or multiple central processing unit (CPU) cores or GPU cores of the computer platform. As a more specific example, the computer platform may be a blade server, and CPU cores of the blade server may be partitioned among multiple compute nodes 104.

As another example, a compute node 104 may be a host abstraction (e.g., a container, a virtual machine or another host abstraction) of a single computer platform or a subpart thereof. As another example, a compute node 104 may be a host abstraction across multiple computer platforms (e.g., a single virtual machine hosted across multiple computer platforms, such as a software-defined server).

Regardless of its particular form, the compute node 104 has associated hardware and software. FIG. 1 depicts specific hardware and software components of a specific compute node 104-1 and is specifically described herein. Other compute nodes 104 may have similar or different architectures and/or components than the compute node 104-1, in accordance with further implementations. For the example implementation that is depicted in FIG. 1, the hardware may include a collection of physical processors 108 (a single processor or multiple processors). As used herein, a "collection" of items, such as a collection of physical processors 108, can refer to a single item or multiple items. A processor 108 may include a microprocessor, a core of a multi-core microprocessor, a microcontroller, a programmable integrated circuit, a programmable gate array, or another hardware processing circuit. As more specific examples, in accordance with some implementations, the processor 108 may be a central processing unit (CPU) core, a collection of CPU cores, a CPU semiconductor package (or "socket"), a graphics processing unit (GPU) core, a collection of GPU cores or a GPU semiconductor package.

The compute node 104 may further include a physical memory 112, which may be implemented using a collection of physical memory devices. In general, the memory devices that form the physical memory 112, as well as other memories and storage media that are described and are referenced herein, are examples of non-transitory machine-readable storage media. In accordance with example implementations, the machine-readable storage media may be used for a variety of storage-related and computing-related functions of the compute node 104. As examples, the memory devices may include semiconductor storage devices, flash memory devices, memristors, phase change memory devices, magnetic storage devices, a combination of one or more of the foregoing storage technologies, as well as memory devices based on other technologies. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

The memory 112, in accordance with example implementations, may store machine-readable instructions 114, which may be executed by one or multiple processors 108 for purposes of providing software components of the compute node 104. For example, in accordance with some implementations, the instructions 114, when executed by the processor(s) 108, may cause the processor(s) 108 to form one or multiple application instances 117 (also called "applications 117" herein). Moreover, the instructions 114, when executed by the processor(s) 108 may cause the processor(s) 108 to form an operating system instance 118 and form one or multiple hierarchical data format (HDF) file input/output (I/O) interface instances (herein called the "HDF file I/O interfaces 120").

More specifically, in accordance with example implementations, a given application 117 (when executed) may provide one or multiple application programming interface (API) requests or "API calls," which are directed to HDF files and are handled, or served, by the HDF file I/O interface 120. For this purpose, the HDF file I/O interface 120 includes an API layer 124, which performs initial integrity processing of an HDF API call (e.g., checking semantics of the HDF API call). A virtual object layer (VOL) 128 of the HDF file I/O interface 120 intercepts HDF API calls and routes the calls (via callbacks) to appropriate connectors. As depicted in FIG. 1, in accordance with example implementations, the HDF file I/O interface 120 includes a fabric-attached memory (FAM) connector 150 and one or multiple other connectors 130. The other connectors 130 may be native connectors, including passthrough and terminal connectors. The FAM connector 150, as described herein, is a terminal connector that serves HDF file API calls that are directed to HDF files that are to be created or already stored in a FAM pool 156 of the distributed system 100.

As depicted in FIG. 1, in accordance with example implementations, the compute nodes 104 may be connected to the FAM pool 156 via FAM interconnect fabric 154. The FAM interconnect fabric 154 may be associated with one or multiple types of communication networks, such as Infiniband or Slingshot fabric, as well as other network fabrics or any combination thereof.

In accordance with example implementations, the FAM pool 156 includes M memory servers, or memory nodes 168 (example memory nodes 168-1 and 168-M being depicted as examples in FIG. 1). The compute nodes 104 may access the FAM pool 156 using remote memory access (RMA) operations 140. As depicted at 159, HDF files 160 may be stored as data 157 in the memory nodes 168. FIG. 1 depicts G HDF files 160 (HDF files 160-1 and 160-G being depicted in FIG. 1) being stored in the FAM pool 156. A given HDF file 160 may be distributed among multiple memory nodes 168 or may be stored in a particular memory node 168. In accordance with example implementations, the FAM pool 156 may be a persistent storage, and correspondingly, the memory devices of the memory nodes 168 may be persistent, or non-volatile memory devices.

In general, the HDF file 160 has HDF objects 164 that have an HDF hierarchy defined by a hierarchical data model 170. The hierarchical data model 170 includes a beginning, or root level that corresponds to a root HDF object 164 (labeled with "R" in FIG. 1). The root HDF object 164 corresponds to the entire HDF file 160. The root object 164 may be connected to one or multiple child HDF objects 164, such as example HDF objects 164-2 and 164-3. The root object 164-1 is connected by corresponding links 166 to the child HDF objects. In this manner, as depicted in FIG. 1, the root object 164-1 may be connected by a link 166 to the HDF object 164-2 and may be connected by another link 166 to the HDF object 164-3. The child HDF objects 164 to the root object 164-1 may be connected to one or multiple other HDF objects 164 via links 166, these HDF objects 164 may be connected via links 166 to other HDF objects, and so forth.

The non-root objects off the HDF file 160 may include, as examples, groups, datasets, data types and data spaces. A group object may be viewed as a directory that may host any of the other HDF objects. A dataset object stores the actual data. The storage of the actual data in a dataset may be either contiguous or chunked, which means that the data is stored into multiple smaller chunks. For a chunked layout, each chunk maps to a data item, and the chunk information is stored in the dataset metadata.

In general, each object 164 may have associated metadata that describes attributes of the object 164. For example, a particular object 164 may be a dataset object, and the associated metadata may describe aspects of the dataset, such as the dataset being acquired with a particular type of sensor, acquired on a specific day, descriptors for chunks of the dataset, and so forth.

As further described herein, the data model 170 of the HDF file 160 does not directly correspond to an organization, or layout, of the FAM pool 156. To accommodate for this difference, mapping information 180 is stored in the FAM pool 156. More specifically, in accordance with example implementations, the FAM connector 150 creates, manages and uses the mapping information 180 for purposes of creating, modifying and deleting data corresponding to HDF files 160 and HDF objects 164. More specifically, in accordance with example implementations, the mapping information 180 for a particular HDF file 160 describes a mapping between the HDF file data model 170 and the descriptors of the corresponding set of FAM data items that store the data and metadata for the HDF file 160. As such, in accordance with example implementations, when the FAM connector 150, creates a particular HDF file 160, the FAM connector 150 creates the corresponding mapping information 180 and stores the mapping information 180 with the data corresponding to the HDF file 160 in the FAM pool 156. The FAM connector 150 uses the mapping information 180 to access the FAM data items that correspond to respective HDF objects 164. Moreover, the FAM connector 150 may modify the mapping information 180, as appropriate (e.g., when HDF data objects 164 are created or deleted, or when HDF files are created or deleted).

In accordance with example implementations, for a given HDF API call that is directed to a particular HDF file 160, the API call may reference a particular HDF object 164 of the file 160. For purposes of performing the function or functions of the API call directed to the HDF object 164 (to serve the API call), the FAM connector 150 uses the mapping information 180 to identify the FAM descriptor that corresponds to the referenced HDF object 164. In general, a FAM descriptor refers to a handle that identifies a particular data item of the FAM memory pool 156. The FAM descriptor(s) identified by the mapping information 180, in turn, allows the FAM connector 150 to access (e.g., access via one or multiple RMA operations 140) the FAM data item corresponding to the HDF object 164.

Figure 2:
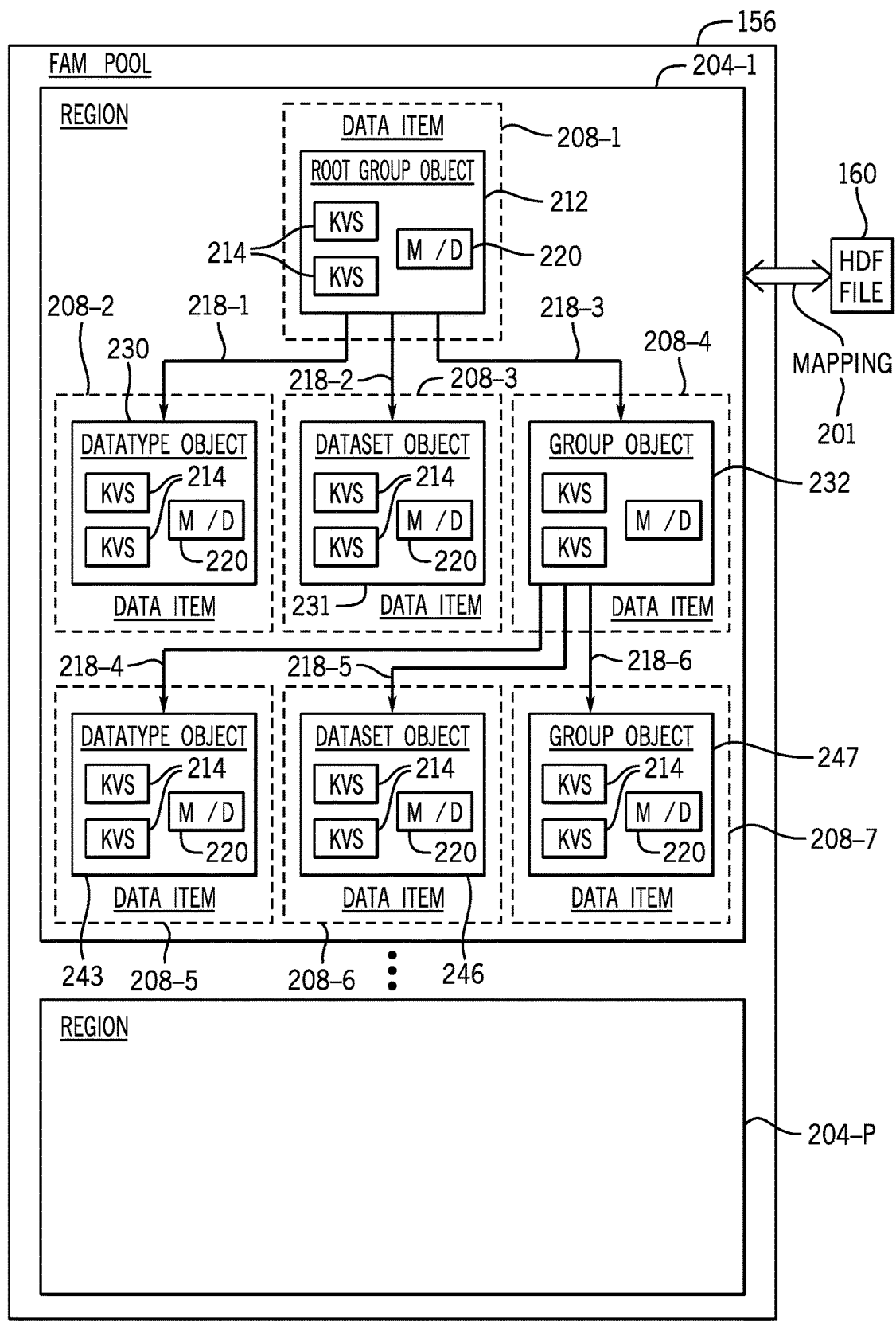
FIG. 2 is an illustration of a relationship of HDF file objects to FAM data items according to an example implementation.

FIG. 2 depicts an example organization of data corresponding to an HDF file in the FAM pool 156 in accordance with some implementations. More specifically, FIG. 2 depicts objects of an HDF file 160 and their relationships according to an HDF hierarchy, and FIG. 2 depicts corresponding data items 208 of the FAM pool 156. For this specific example, an HDF file 160 is mapped (as depicted at reference numeral 201) to a particular region 204-1 of the FAM pool 156. In accordance with example implementations, the HDF file 160 is stored as a collection of data items 208 that are contained in a region 204-1 of the FAM pool 156. In this manner, in accordance with example implementations, the region 204-1 serves as a container for the HDF file 160. As depicted in FIG. 2, the FAM pool 156 may include one or multiple other regions (P regions 204 being illustrated in FIG. 2 and specifically, region 204-1 and 204-P being depicted). The particular region 204 has a set of properties (e.g., security properties and other properties).

For the example region 204-1, the HDF file 160 maps to a set of data items 208, including a data item 208-1 that corresponds to a root group object 212 of the HDF file 160. Moreover, for this example, the root group object 212 is connected, via the HDF hierarchy for the file 160, by corresponding links 218-1, 218-2 and 218-3 to a datatype object 230, a dataset object 231 and a group object 232, respectively. Stated differently, for this example, the datatype object 230, dataset object 231 and group object 232 are located in a hierarchical level below the top, or root, level containing the root group object 212. Moreover, for the example that is depicted in FIG. 2, the group object 232 is connected by corresponding links 218-4, 218-5 and 218-6 to a datatype object 245, a dataset object 246 and a group object 247, respectively, which reside in a hierarchical level below the hierarchical level containing the datatype object 230, dataset object 231 and group object 232.

In accordance with example implementations, mapping information is stored in the region 204-1 in the form of key value stores (KVSs) 214. In accordance with example implementations, each data item 208 stores a KVS 214, which corresponds to a node of a trie data structure, which maps identifiers for the data items 208 to corresponding FAM descriptors. As an example, in accordance with some implementations, this trie structure may be a radix trie structure.

In general, a KVS 214 of a particular data item 208 contains mapping information for the data items 208 of the next HDF hierarchical level. As a more specific example, a KVS 214 of the data item 208-1 stores mapping information for FAM descriptors for the data item 208-2 (storing data for the datatype object 230), data item 208-3 (storing data for the data item 231) and data item 208-4 (storing data for the group object 232).

In accordance with example implementations, the KVS 214 associates, or maps, a particular FAM descriptor to a corresponding link 218 identifier. A given HDF API call may, for example, reference a particular HDF object of an HDF file by an HDF object identifier. The HDF object identifier, in turn, may be used by a FAM connector for purposes of identifying a particular next HDF object (from the current HDF object) and based on this identification, the KVS 214 may be used to identify a particular FAM descriptor of the data item that contains the data for this HDF object. In accordance with example implementations, based on the HDF object identifier, the FAM connector may traverse the KVSs 214 for purposes of arriving at a particular FAM descriptor for a data item 208 that corresponds to the HDF object that is referenced by the HDF API call. For example, a particular HDF API call may contain an HDF object identifier that specifically identifies the dataset object 246. As depicted in FIG. 2, the data item 208-6 contains the data for the dataset object 246. For purposes of the FAM connector deriving the specific FAM descriptor of the data item 208-6, the FAM connector may first, via a name service, determine a FAM identifier that corresponds to the data item 208-1 that contains the root group object 212. The FAM connector may then access a KVS 214 of the data item 208-1, and based on the HDF object identifier, identify the data item 208-4 (which contains the group object 232) as being the next data item to access.

Continuing the example, the access KVS 214 of the data item 208-1 identifies the data item 208-4. The FAM connector may then access a KVS 214 of the data item 208-4 for purposes of determining a FAM descriptor corresponding to a data item that contains a dataset object 246 identified by the HDF object identifier. For this example, the data item 208-6 contains data for the dataset object 246, and the KVS 214 of the data item 208-4 associates the dataset object 246 with a FAM descriptor for the data item 208-6. Moreover, for this example, the dataset object 246 is the HDF object referenced by the HDF API call. Using the FAM descriptor for the data item 208-6, the FAM connector may then access the data item 208-6 to access the corresponding data for the dataset object 246.

For the specific example depicted in FIG. 2, each data item 208 contains two KVSs. As an example a particular KVS 214 may correspond to HDF identifiers that contain link names, and another KVS 214 may correspond to link identifiers that contain link indices.

Figure 3:
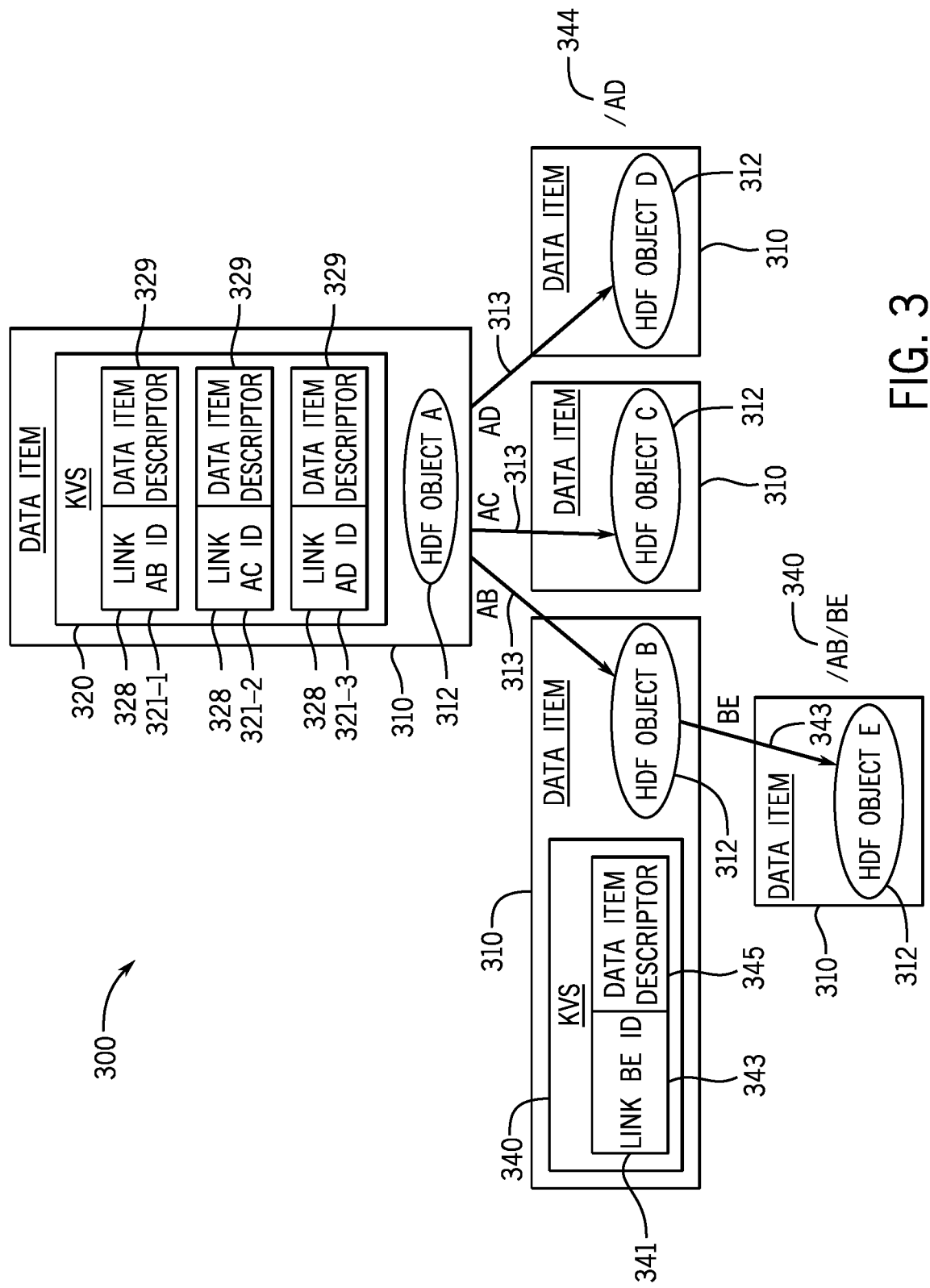
FIG. 3 is an illustration of a trie structure that maps HDF object identifiers to FAM data item descriptors according to an example implementation.

FIG. 3 depicts a more detailed illustration 300 of the trie structure-based mapping in accordance with example implementations. More specifically, the illustration 300 depicts example data items 310 that store information (e.g., data and metadata) for corresponding respective HDF objects 312. FIG. 3 depicts specific HDF objects 312 called "HDF object A," HDF object B," "HDF object C", "HDF object D" and "HDF object E." The HDF objects are arranged in a depicted HDF hierarchy such that the HDF object A is at a first, uppermost level of the depicted hierarchy; HDF objects B, C and D are at the second level of the hierarchy below the first level; and HDF object E is at the third level of the hierarchy below the second level.

A given HDF object 312 may be referenced by an HDF object identifier that is a concatenation of identifiers for the links that are traversed (according to the HDF hierarchy) to reach the HDF object 312. FIG. 3 depicts links 313 between HDF object A and HDF objects B, C and D. For the example implementation that is depicted in FIG. 3, the links are referenced by respective names. For example, the HDF object A is connected to HDF object D by a corresponding 313 link having a link name "AD." If the HDF object A is the root object of the HDF file, then the link identifier for this object may be "/," and the HDF object identifier for HDF object D, as an example, is "/A/D," as depicted at 344. Using a similar notation, the HDF object A is connected to the HDF object B by a link 313 "AB," and the HDF object identifier for the HDF object B is "/AB." HDF object B is connected to HDF object E by a link 343 "BE," and the HDF object identifier for the HDF object E is "/AB/BE," as depicted at 340.

Continuing the example, the data item 310 that contains the data and metadata for the HDF object A also contains a KVS 320 with three entries, or key-value pairs, 321-1, 321-2 and 321-3, which are associated with HDF objects B, C and D, respectively. Each key-value pair 321 contains a key 328 and a value 329. The key 328 is an identifier (e.g., a link name) of a link from the HDF object A to another HDF object, and the corresponding value 329 is a FAM descriptor of the data item 310 that contains information (e.g., data, metadata and possibly another KVS store) to the other HDF object connected by the link.

As a more specific example, the key-value pair 321-1 contains a key 328, which is a link identifier for link "AB." As a more specific example, the link identifier may be "/AB." The corresponding value 329 of the key-value pair 321-1 is a FAM data item descriptor for the FAM data item 310 that contains the information (e.g., data, metadata and another KVS store 340) for HDF object B.

The KVS 320 also contains a key-value pair 321-2, which contains a key 328, which is a link identifier for link "AC." As a more specific example, the link identifier may be "/AC." The corresponding value 329 of the key-value pair 321-2 is a FAM data item descriptor for the FAM data item 310 that contains the information (e.g., data and metadata) for HDF object C. For this example, another HDF object is not connected to the HDF object C, and correspondingly, the FAM data item descriptor 310 for the HDF object C does not contain a KVS store.

The KVS 320 also contains a key-value pair 321-3, which contains a key 328, which is a link identifier for link "AD." As a more specific example, the link identifier may be "/AD." The corresponding value 329 of the key-value pair 321-3 is a FAM data item descriptor for the FAM data item 310 that contains the information (e.g., data and metadata) for HDF object D. For this example, another HDF object is not connected to the HDF object D, and correspondingly, the FAM data item descriptor 310 for the HDF object D does not contain a KVS store.

The KVS store 340 of the data item 310 that contains the information for the HDF object B contains a key-value pair 341 that includes a key 343, which is a link identifier for link "AD." A corresponding value 345 of the key-value pair 341 is a FAM data item descriptor for the FAM data item 310 that that contains the information (e.g., data and metadata) for HDF object E.

As an example, assuming that the identifier (/AB/BE) for HDF object E is referenced by a particular HDF API call, then the FAM connector may proceed as follows for purposes of identify the FAM descriptor for the data item 310 that corresponds to HDF object E. For this example, it is assumed that the HDF object A is the root object of the HDF file. The FAM connector accesses the key-value pair 321-1, based on the key-value pair 321-1 containing a link identifier (the key 328 of the) corresponding to the link AB. The value 329 of the key-value pair 321-1 identifies the FAM descriptor of the data item 310 at the other end of the link AB. The FAM connector then accesses the KVS store and more specifically accesses the key-value pair 341 due to the key 343 of the key value pair 341 containing a link identifier corresponding to the link BE. More specifically, the FAM connector accesses the corresponding value 345 that is the FAM descriptor for the data item 310 that corresponds to the HDF object 312.

Although in the foregoing example, the KVS store associates link names (the keys) with FAM data item descriptors (the values), in accordance with further example implementations, a given KVS may associate link indices (the keys) with FAM data item descriptors (the values). In accordance with some implementations, a given data item may store data representing one KVS store for link names and another KVS store for link indices. Two KVSs per data item is illustrated in the example implementation depicted in FIG. 2.

Figure 4:
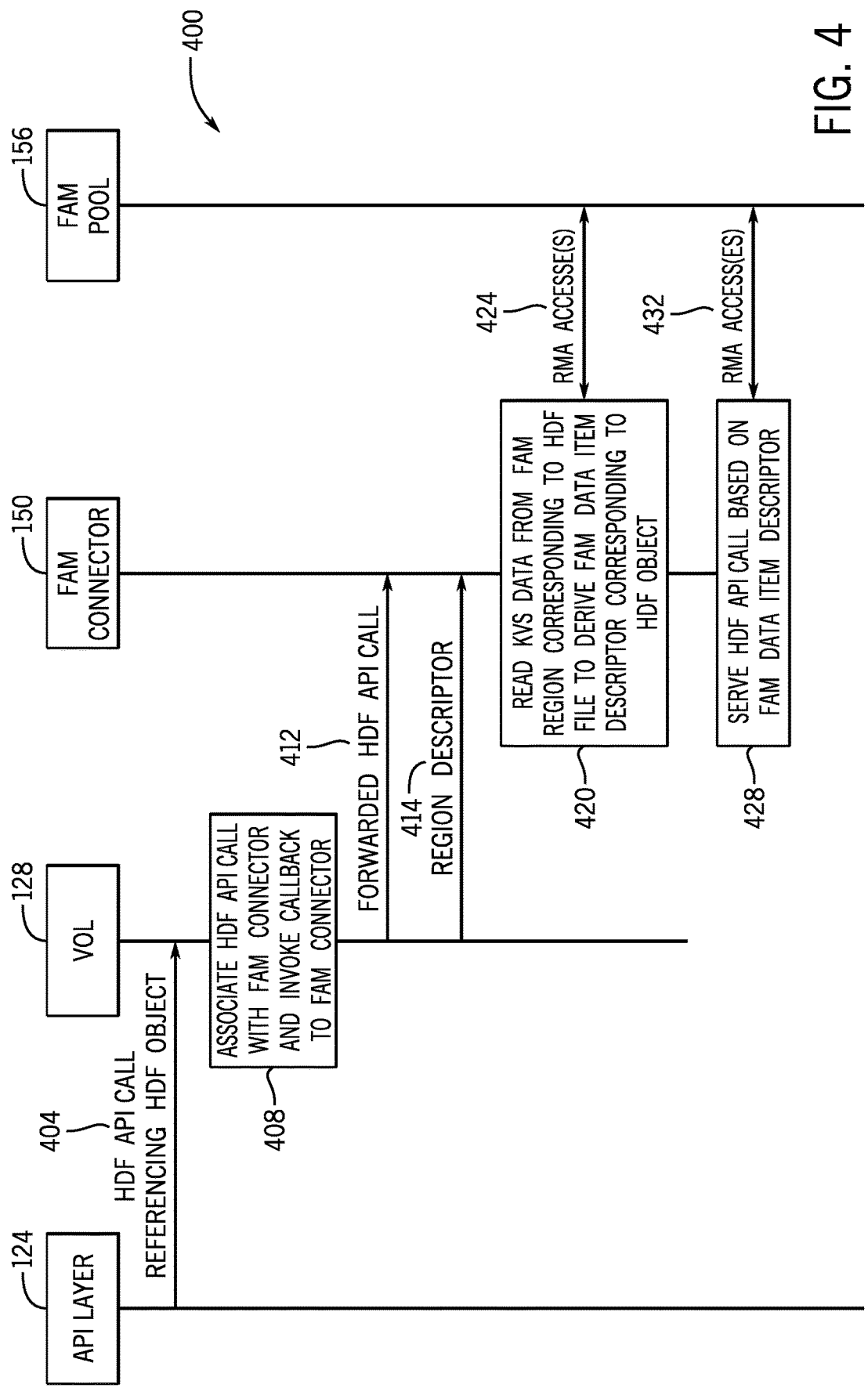
FIG. 4 is a flow diagram depicting messaging and actions taken by an HDF file I/O interface according to an example implementation.

FIG. 4 depicts an illustration 400 of communications and actions taken by components of an HDF file I/O interface (e.g., the HDF file I/O interface 120 of FIG. 1), in accordance with example implementations, for purposes of processing an HDF API call. More specifically, referring to FIG. 4, an API layer 124 provides an HDF API call 404 to the VOL 128. The VOL 128, in general, intercepts HDF API calls and forwards HDF API calls that target HDF files of a FAM memory pool to the FAM connector 150. As depicted at 408, the VOL 128 associates the HDF API call 404 with the FAM connector 150. As an example, the association of the HDF API call 404 with the FAM connector 150 may be based on file access properties of the HDF file, which were created when the HDF file was created or opened. In this manner, the HDF API call 404 may, for example, reference an HDF file whose file access properties associates the HDF file with the FAM connector 150.

The VOL 128 next provides the forwarded HDF API call to the FAM connector 150, as depicted at 412. In response to the forwarded HDF API call 412, the FAM connector 150 begins a process to serve the call. More specifically, the FAM connector 150 retrieves a FAM region descriptor 414 corresponding to the HDF file and, as depicted at 420, the FAM connector 150 reads KVS data from the FAM region corresponding to the HDF file to derive a FAM object identifier corresponding to the HDF object that is referenced by the HDF API call. Reading the KVS data may involve one or multiple RMA accesses 424. In this manner, the FAM connector 150 may traverse a trie structure by reading one or multiple KVSs from one or multiple data items of the region that contains the HDF file. The FAM connector 150 may then continue to serve the HDF API call based on the derived FAM object identifier, as depicted at 428. The service of the HDF API call may include one or multiple additional RMA accesses 432.

Figure 5:
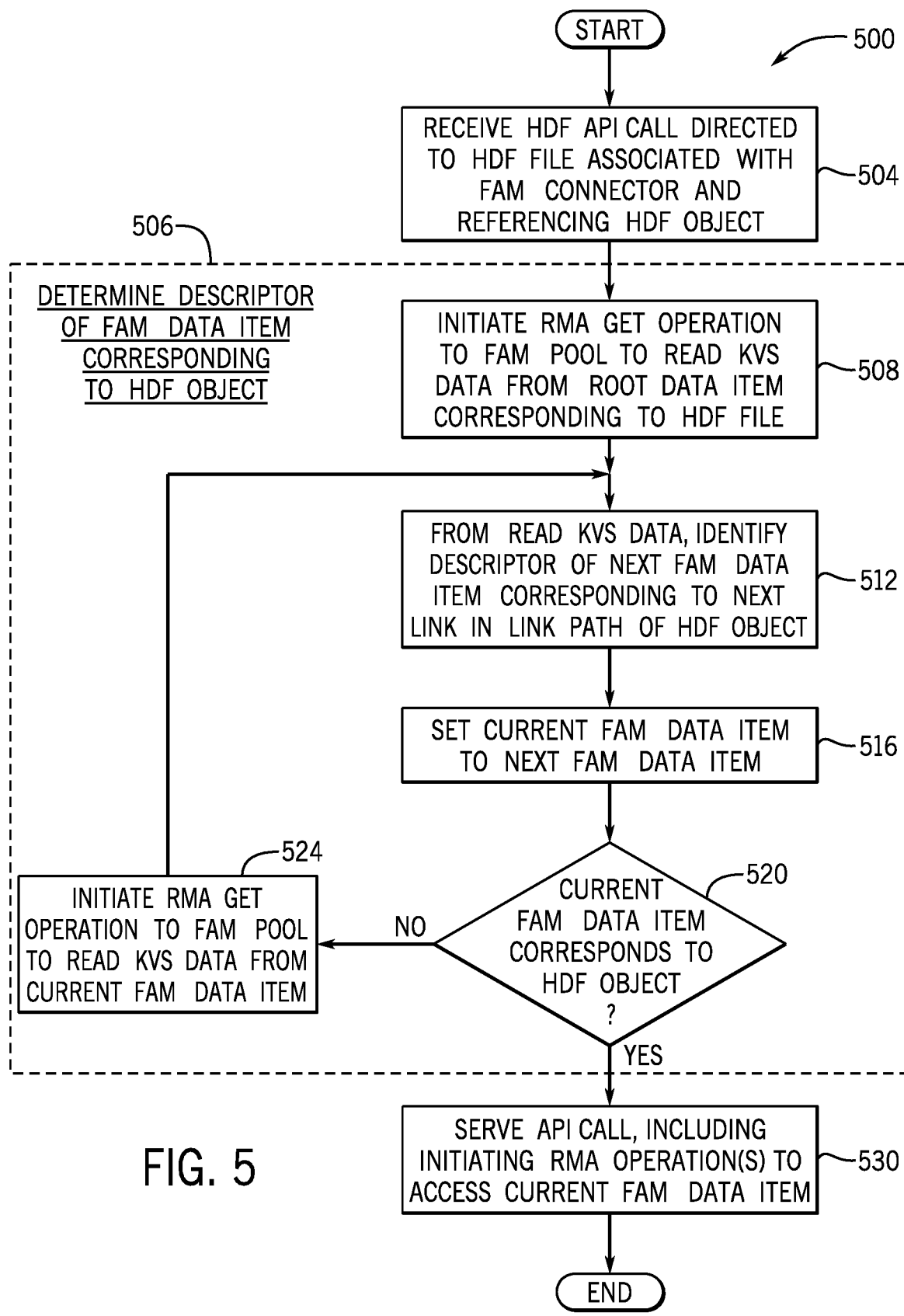
FIG. 5 is a flow diagram depicting a process performed by a FAM connector to serve an HDF file API call according to an example implementation.

FIG. 5 is a flow diagram 500 depicting a process performed by a FAM connector (e.g., the FAM connector 150 of FIG. 1) for purposes of deriving mapping information for an HDF object in the processing of an HDF API call, in accordance with example implementations. Referring to FIG. 5, the process 500 includes receiving (block 504) an HDF API call that is directed to an HDF file that is associated with the FAM connector and references an HDF object. Pursuant to block 508, the process 500 includes the FAM connector initiating an RMA get operation to FAM to read KVS data from a root data item that corresponds to the HDF file.

Next, the process 500 includes a subprocess 506 to a descriptor for the HDF object. The subprocess 506 includes initiating (block 508) an RMA Get operation to FAM to read KVS data from the root data item that corresponds to the HDF file. The subprocess 506 performs one or multiple iterations to arrive at the FAM descriptor for the HDF object.

Each iteration first includes, from the read KVS data, identifying a descriptor of the next data item that corresponds to the next link in the link path of the HDF object, pursuant to block 512. The current data item is then set to the next data item, pursuant to block 516. The current data item may correspond to the HDF object that is referenced in the API call. In this regard, the iteration includes determining (decision block 520) if the current data item corresponds to the HDF object. If not, then another iteration is initialized by initiating an RMA Get operation to FAM to read the KVS data from the current data item, pursuant to block 524, and control then returns to block 512.

The subprocess 506 to determine the descriptor for the HDF object concludes with the determination being made in decision block 520 that the current data item corresponds to the HDF object. At this point, the descriptor for the current data item corresponds to the descriptor for the data item that contains the data for the HDF object. The process 500 includes, pursuant to block 530, serving the API call including initiating one or multiple RMA operations to access the current data item.

Figure 6:
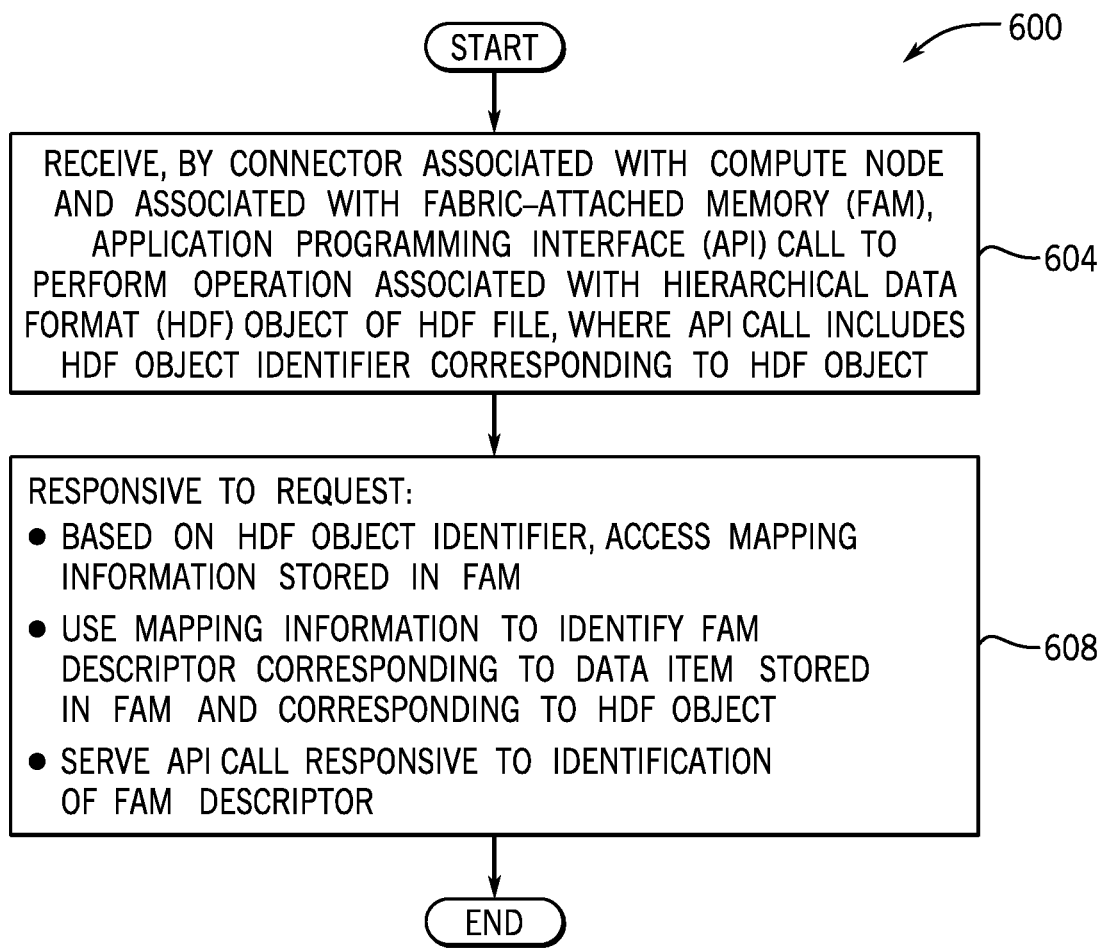
FIG. 6 is a flow diagram depicting a technique to serve an API call to perform an operation associated with an HDF object of an HDF file according to an example implementation.

Referring to FIG. 6, in accordance with example implementations, a process 600 includes receiving (block 604), by a connector that is associated with a compute node and associated with a fabric-attached memory (FAM), an application programming interface (API) call. In accordance with some implementations, the FAM may be a persistent storage containing persistent, or non-volatile, memory devices. The call is a request to perform an operation that is associated with a hierarchical data format (HDF) object of an HDF file. In accordance with some implementations, the HDF file may be an HDF5 file. As examples, the HDF object may be a group object, a dataset object, a datatype object. Any of these HDF objects may have associated attribute metadata. The API call includes, or references, an HDF object identifier, which corresponds to an HDF object. As an example, the HDF object identifier may represent a link path. As an example, the link path may be represented by references to one or more link names. As another example, the link path may be represented by one or more indices.

The process 600 includes, responsive to the request, based on the HDF object identifier, accessing (block 608), by the connector, mapping information that is stored in the FAM. In accordance with some implementations, the mapping information maps a hierarchical data model of the HDF file to data items stored in a region of the FAM. In accordance with some implementations, the mapping information may be a trie structure. In accordance with some implementations, nodes of the trie structure may be stored in FAM data items. In accordance with some implementations, the trie nodes may be represented by key-value stores. In accordance with some implementations, a given key-value pair of a key value store may contain a key that represents a link identifier of the HDF file and the corresponding value that represents a descriptor of a FAM data item that contains information for the data item referenced by the link.

The process 600 includes, responsive to the request, using (block 608), by the connector, the mapping information to identify a FAM descriptor corresponding to a data item that is stored in the FAM and corresponds to the HDF object. In accordance with example implementations, identifying the FAM descriptor may include traversing a trie structure, where each node of the trie structure references another node and ultimately identifies the FAQM descriptor corresponding to the data item that contains information for the HDF object referenced by the API call.

The process 600 further includes, responsive to the request, serving (block 608), by the connector, the API call responsive to the identification of the FAM descriptor. In accordance with example implementations, serving the API call includes performing one or more functions requested by the API call. In accordance with some implementations, serving the API call may include performing one or multiple remote memory access (RMA) operations with the FAM.

Figure 7:
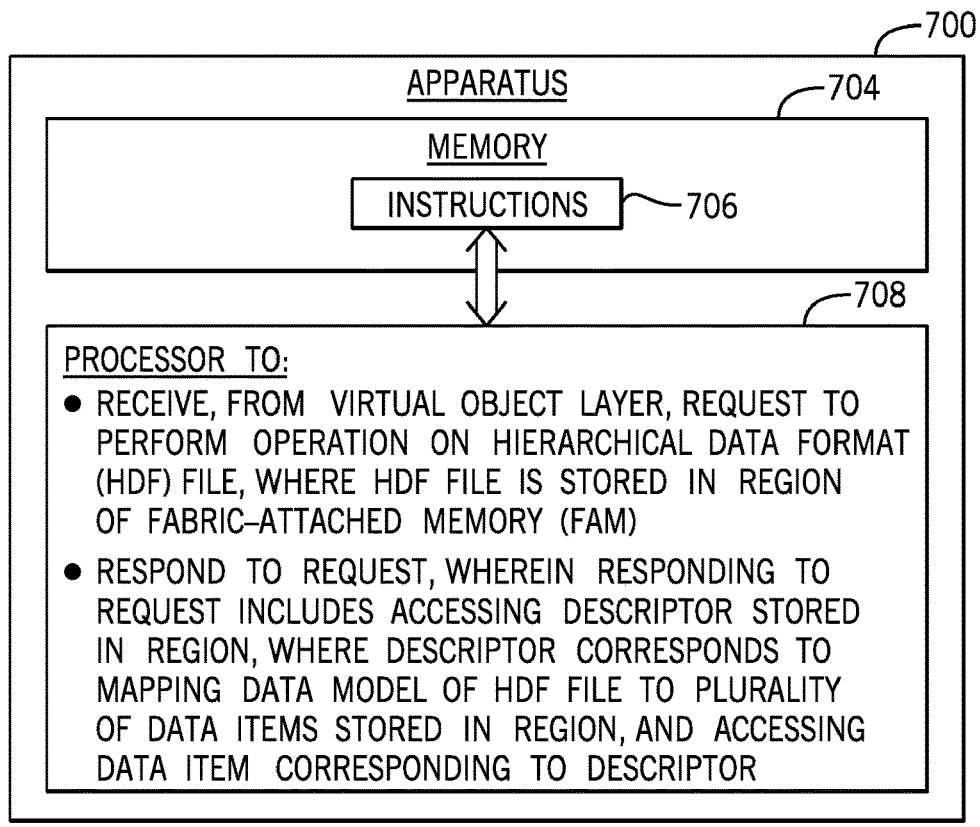
FIG. 7 is a block diagram of an apparatus having a processor to serve a request to perform an operation on an HDF file stored in a region of a FAM according to an example implementation.

Referring to FIG. 7, in accordance with example implementations, an apparatus 700 includes a memory 704 and a processor 708. The memory 704 stores instructions 706. The instructions 706, when executed by the processor 708, cause the processor 708 to receive, from a virtual object layer, a request to perform an operation on a hierarchical data format (HDF) file. The virtual object layer may be a component of an HDF file I/O interface. The request may be an API call to perform an operation that is associated with an HDF object of the HDF file. In accordance with some implementations, the HDF file may be an HDF5 file. As examples, the HDF object may be a group object, a dataset object, a datatype object. Any of these HDF objects may have associated attribute metadata. The API call may include, or references, an HDF object identifier, which corresponds to an HDF object. As an example, the HDF object identifier may represent a link path. As an example, the link path may be represented by references to one or more link names. As another example, the link path may be represented by one or more indices.

The HDF file is stored in a region of fabric-attached memory (FAM). In accordance with some implementations, the FAM may be a persistent storage containing persistent, or non-volatile, memory devices.

The instructions 706, when executed by the processor 708, further cause the processor to, respond to the request. Responding to the request includes accessing a descriptor that is stored in the region. Accessing the descriptor may include performing one or multiple RMA operations (e.g., a Get operation, a Put operation or an Accumulate operation). The descriptor may correspond to a FAM data item and include a FAM region ID corresponding to the region and an offset of the FAM data item within the region. The descriptor corresponds to a mapping of a data model of the HDF file to a plurality of data items that are stored in the region. In accordance with some implementations, the descriptor may be a value of a key-value pair that is stored in a data item of the region. The key of the key value store may correspond to a link path of an HDF object referenced in the request. Responding to the request further includes accessing a data item that corresponds to the descriptor. Accessing the data item may include performing one or multiple RMA operations (e.g., a Get operation, a Put operation or an Accumulate operation).

Figure 8:
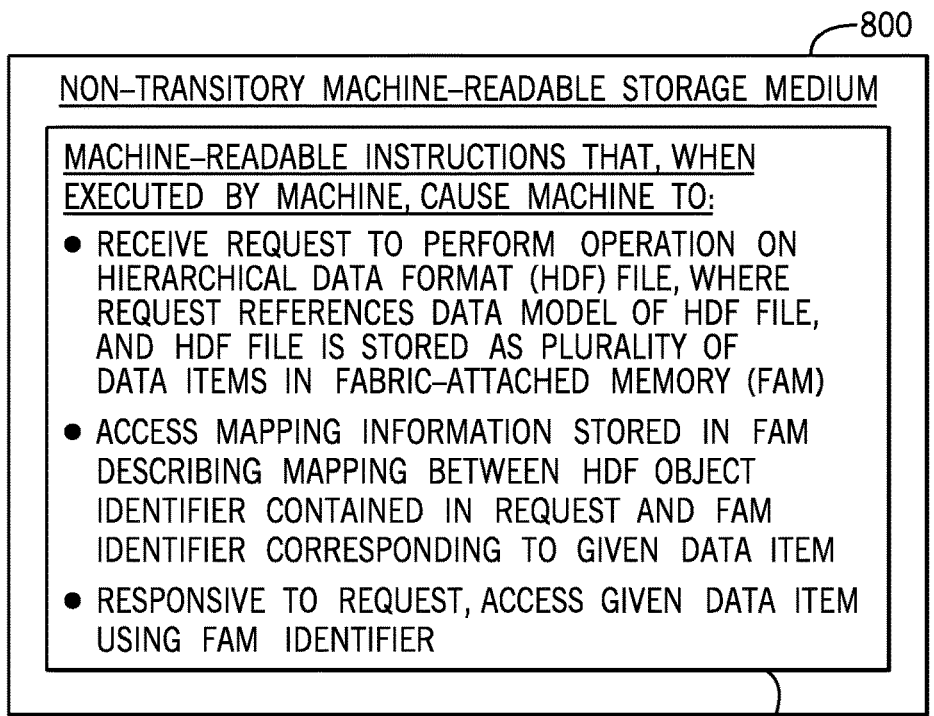
FIG. 8 is an illustration of machine-readable instructions that cause a machine to access a data item corresponding to an HDF object identifier contained in a request to perform an operation associated with an HDF file according to an example implementation.

Referring to FIG. 8, in accordance with example implementations, a non-transitory machine-readable storage medium 800 includes machine-readable instructions 804 that, when executed by a machine, cause the machine to receive a request to perform an operation on a hierarchical data format (HDF) file. The HDF file may be an HDF5 file. The request may be an HDF5 API call. The API call may be handled by an OpenFAM API.

The request references a data model of the HDF file, and the HDF file is stored as a plurality of data items in a fabric-attached memory (FAM). The FAM may contain memory nodes that provide a persistent memory pool, and the HDF file may be stored in the persistent memory pool.

The instructions 706, when executed by the machine, further cause the machine to access mapping information that is stored in the FAM. Access the mapping information may include perform one or multiple RMA operations with the FAM. The RMA operations may be one-sided communications and may include a Get operation, a Put operation or an Accumulate operation.

The mapping information describes mapping between an HDF object identifier that is contained in the request and a FAM identifier corresponding to the given data item. The FAM identifier corresponding to the given data item may include a region ID and an offset to the data item. The instructions 804, when executed by the machine, further cause the machine to, responsive to the request, access the given data item using the FAM identifier. Accessing the given data item using the FAM identifier may include one or multiple RMA operations. Accessing the given data item may include traversing a trie structure stored in the region. The trie structure may include KVSs that corresponding to nodes of the trie structure. A particular KVS may be stored in a data item of a FAM region and contain a key that corresponds to a link path of an HDF object referenced by the request and a value that corresponds to a FAM descriptor of a data item that contains another KVS. A given data item may contain a KVS containing leys that correspond to link names and another KVS corresponding to keys that correspond to link indices.

In accordance with example implementations, the connector includes a pass-through virtual object layer (VOL) connector. A particular advantage is that HDF files may be advantageously stored in FAM of a computer system, which may be efficiently scaled independently from compute nodes of the computer system.

In accordance with example implementations, a VOL intercepts the API call and responsive to a file access property of the HDF file, routes the API call to the connector. A particular advantage is that HDF files may be advantageously stored in FAM of a computer system, which may be efficiently scaled independently from compute nodes of the computer system.

In accordance with example implementations, accessing the mapping information includes accessing a trie data structure distributed among a plurality of data items that are stored in the FAM. The trie data structure maps a plurality of HDF identifiers to a plurality of FAM descriptors. A particular advantage is that HDF files may be advantageously stored in and accessed from FAM of a computer system, which may be efficiently scaled independently from compute nodes of the computer system.

In accordance with example implementations, the HDF identifiers include one of a plurality of names corresponding to respective HDF objects or a plurality of indices corresponding to respective HDF objects. A particular advantage is that HDF files may be advantageously stored in and accessed from FAM of a computer system, which may be efficiently scaled independently from compute nodes of the computer system.

In accordance with example implementations, accessing the mapping information includes accessing a first part of the trie structure, which is stored in a given data item and corresponds to a root HDF object of the HDF file. Accessing the mapping information further includes, based on the first part, identifying a data item storing a second part of the trie structure and accessing the data item storing the second part of the trie structure. A particular advantage is that HDF files may be advantageously stored in and accessed from FAM of a computer system, which may be efficiently scaled independently from compute nodes of the computer system.

In accordance with example implementations, accessing the mapping information includes performing a remote memory access (RMA) operation. A particular advantage is that HDF files may be advantageously stored in and accessed from FAM of a computer system, which may be efficiently scaled independently from compute nodes of the computer system.

In accordance with example implementations, serving the API call responsive to the identification of the first FAM descriptor includes accessing the data item. A particular advantage is that HDF files may be advantageously stored in and accessed from FAM of a computer system, which may be efficiently scaled independently from compute nodes of the computer system.

In accordance with example implementations, accessing the first data item includes initiating a remote memory access (RMA) operation to access the data item. A particular advantage is that HDF files may be advantageously stored in and accessed from FAM of a computer system, which may be efficiently scaled independently from compute nodes of the computer system.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
    receiving, by a connector associated with a compute node and associated with a fabric-attached memory (FAM), an application programming interface (API) call to perform an operation associated with a first hierarchical data format (HDF) object of an HDF file, wherein the API call comprises a first HDF object identifier corresponding to the first HDF object;
    responsive to the request:
        based on the first HDF object identifier, accessing, by the connector, mapping information stored in the FAM;
        using, by the connector, the mapping information to identify a first FAM descriptor corresponding to a first data item stored in the FAM and corresponding to the first HDF object; and
        serving, by the connector, the API call responsive to the identification of the first FAM descriptor.

2. The method of claim 1, wherein the connector comprises a pass-through virtual object layer (VOL) connector.

3. The method of claim 1, further comprising intercepting, by a virtual object layer (VOL), the API call and responsive to a file access property of the HDF file, routing the API call to the connector.

4. The method of claim 1, wherein accessing the mapping information comprises accessing a trie data structure distributed among a plurality of data items stored in the FAM, wherein the trie data structure maps a plurality of HDF identifiers to a plurality of FAM descriptors, the plurality of HDF identifiers comprise the first HDF identifier, and the plurality of FAM descriptors comprises the first FAM descriptor.

5. The method of claim 4, wherein the plurality of HDF identifiers comprises one of a plurality of names corresponding to respective HDF objects or a plurality of indices corresponding to respective HDF objects.

6. The method of claim 4, wherein accessing the mapping information comprises:
    accessing a first part of the trie structure stored in a given data item of the plurality of data items corresponding to a root HDF object of the HDF file;
    based on the first part, identifying a data item of the plurality of data items storing a second part of the trie structure; and
    accessing the data item storing the second part of the trie structure.

7. The method of claim 1, wherein accessing the mapping information comprises performing a remote memory access (RMA) operation.

8. The method of claim 1, wherein serving the API call responsive to the identification of the first FAM descriptor comprises accessing the first data item.

9. The method of claim 8, wherein accessing the first data item comprises initiating a remote memory access (RMA) operation to access the first data item.

10. An apparatus comprising:
    a processor; and
    memory to store instructions that, when executed by the processor, cause the processor to:
        receive, from a virtual object layer, a request to perform an operation on a hierarchical data format (HDF) file, wherein the HDF file is stored in a region of a fabric-attached memory (FAM);
        respond to the request, wherein responding to the request includes accessing a descriptor stored in the region, wherein the descriptor corresponds to a mapping of a data model of the HDF file to a plurality of data items that are stored in the region, and accessing a data item corresponding to the descriptor; and
        use the information to serve the request.

11. The apparatus of claim 10, wherein the request identifies an HDF object of the HDF file and the instructions, when executed by the processor, further cause the processor to:
    read key value store data from a root data item stored in root data item of the region;
    based on the key value store data read from the root data item, identify a descriptor corresponding to a second data item of the region corresponding to a link path of the HDF object; and
    access a data item of the HDF file corresponding to the HDF object based on the descriptor corresponding to the second data item.

12. The apparatus of claim 11, wherein the instructions, when executed by the processor, further cause the processor to initiate a remote memory access (RMA) operation to read the key value store data from the root data item.

13. The apparatus of claim 11, wherein the second data item corresponds to the data item of the HDF file corresponding to the HDF object.

14. The apparatus of claim 11, wherein the instructions, when executed by the processor, further cause the processor to:
    using the descriptor corresponding to the second data item, read key value store data from the second data item to identify a descriptor corresponding a third data item of the region corresponding to the link path of the HDF object; and
    access the data item of the HDF file corresponding to the HDF object based on the descriptor corresponding to the third data item.

15. The apparatus of claim 11, wherein the request identifies an HDF object of the HDF file, and serving the request comprises reading from or writing to a data item of the HDF file corresponding to the HDF object.

16. A non-transitory computer-readable storage medium to store machine-readable instructions that, when executed by a machine, cause the machine to:
receive a request to perform an operation on a hierarchical data format (HDF) file, wherein the request references a data model of the HDF file, and the HDF file is stored as a plurality of data items in a fabric-attached memory (FAM);
access mapping information stored in the FAM describing a mapping between an HDF object identifier contained in the request and a FAM identifier corresponding to a given data item of the plurality of data items; and
responsive to the request, access the given data item using the FAM identifier.

17. The storage medium of claim 16, wherein the instructions, when executed by the machine, further cause the machine to initiate at remote memory access (RMA) operations to access the mapping information and access the given data item.

18. The storage medium of claim 16, wherein the instructions, when executed by the machine, further cause the machine to access at least one key value store contained in at least one data item of the plurality of data items to access the mapping information.

19. The storage medium of claim 16, wherein the instructions, when executed by the machine, further cause the machine to initiate a plurality of remote memory access (RMA) operations to the FAM to read a plurality of data items stored in the FAM to read the mapping information.

20. The storage medium of claim 19, wherein the mapping information is stored in a trie structure distributed across the plurality of data items.

* * * * *